United States Patent
Tiell et al.

(10) Patent No.: US 10,509,806 B2
(45) Date of Patent: Dec. 17, 2019

(54) RECOMMENDATION ENGINE FOR AGGREGATED PLATFORM DATA

(71) Applicant: Accenture Global Solutions Limited, Dublin (IE)

(72) Inventors: Steven C. Tiell, San Francisco, CA (US); Edy S. Liongosari, San Jose, CA (US); Chetan R. Kundavaram, Fremont, CA (US); Shimon Modi, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 664 days.

(21) Appl. No.: 15/093,374

(22) Filed: Apr. 7, 2016

(65) Prior Publication Data

US 2017/0053032 A1    Feb. 23, 2017

Related U.S. Application Data

(60) Provisional application No. 62/206,078, filed on Aug. 17, 2015.

(51) Int. Cl.
*G06F 17/30* (2006.01)
*G06F 16/28* (2019.01)
(Continued)

(52) U.S. Cl.
CPC .......... *G06F 16/285* (2019.01); *G06F 16/113* (2019.01); *G06F 16/162* (2019.01);
(Continued)

(58) Field of Classification Search
CPC ......... G06F 17/30528; G06F 17/30598; G06F 21/6227; G06F 21/6236; G06F 16/285;
(Continued)

(56) References Cited

U.S. PATENT DOCUMENTS 8,413,251 B1    4/2013   Gibney et al.
8,805,699 B1 *  8/2014   Lang .................. G06Q 50/01
                                                    705/319
(Continued)

FOREIGN PATENT DOCUMENTS

WO    WO 2016063092    4/2016

OTHER PUBLICATIONS

U.S. Non-Final Office Action for U.S. Appl. No. 15/093,344, dated May 3, 2018, 20 pages.
(Continued)

*Primary Examiner* — Greta L Robinson
(74) *Attorney, Agent, or Firm* — Fish & Richardson P.C.

(57) ABSTRACT

Techniques are described for receiving data generated by multiple platforms of different types, and determining recommendations for end-user(s) of the multiple platforms based on an analysis of the received data. An end-user may interact with multiple individual platforms of different types. The individual platforms may generate data describing, and/or resulting from, such interactions. The data may be received, ingested, stored, analyzed, and/or otherwise processed by a super-platform. The data may be aggregated and the data and/or aggregate data may be analyzed by a recommendation engine executing on the super-platform to determine one or more recommendations for a particular end-user based on an analysis of the data and/or aggregate data associated with that end-user. Such recommendation(s) may be provided to the end-user through an end-user interface and/or search engine provided by the super-platform, or through a third-party entity.

20 Claims, 5 Drawing Sheets

(51) Int. Cl.
*G06F 16/22* (2019.01)
*G06F 16/29* (2019.01)
*G06F 16/11* (2019.01)
*G06F 16/16* (2019.01)
*G06F 16/9535* (2019.01)
*G06F 16/2457* (2019.01)
*G06F 21/62* (2013.01)
*G06Q 30/06* (2012.01)
*G06Q 30/02* (2012.01)
*H04L 12/26* (2006.01)
*H04L 29/08* (2006.01)

(52) U.S. Cl.
CPC ........ *G06F 16/22* (2019.01); *G06F 16/24575* (2019.01); *G06F 16/29* (2019.01); *G06F 16/9535* (2019.01); *G06F 21/6227* (2013.01); *G06F 21/6236* (2013.01); *G06Q 30/0201* (2013.01); *G06Q 30/0601* (2013.01); *G06Q 30/0631* (2013.01); *H04L 43/04* (2013.01); *H04L 43/0876* (2013.01); *H04L 67/22* (2013.01)

(58) Field of Classification Search
CPC ............. G06F 16/24575; G06F 16/162; G06F 16/113; G06F 16/29; G06F 16/22; G06F 16/9535; H04L 43/0876; H04L 43/04; H04L 67/22; G06Q 30/0601; G06Q 30/0631; G06Q 30/0201
See application file for complete search history.

(56) References Cited

U.S. PATENT DOCUMENTS

| | | | |
|---|---|---|---|
| 9,928,290 B2* | 3/2018 | Tiell | G06F 16/285 |
| 2002/0099643 A1* | 7/2002 | Abeshouse | G06Q 50/188 |
| | | | 705/37 |
| 2007/0103984 A1 | 5/2007 | Kavuri et al. | |
| 2009/0037355 A1* | 2/2009 | Brave | G06F 17/30867 |
| | | | 706/45 |
| 2009/0224941 A1 | 9/2009 | Kansal | |
| 2009/0228397 A1 | 9/2009 | Tawakol et al. | |
| 2011/0054934 A1* | 3/2011 | Vesto | G06Q 10/06 |
| | | | 705/3 |
| 2011/0276423 A1* | 11/2011 | Davidson | G06Q 30/0601 |
| | | | 705/26.1 |
| 2012/0054680 A1 | 3/2012 | Moonka et al. | |
| 2012/0197856 A1 | 8/2012 | Banka et al. | |
| 2012/0254289 A1* | 10/2012 | Sathish | G06Q 30/0631 |
| | | | 709/203 |
| 2012/0290950 A1* | 11/2012 | Rapaport | H04L 67/306 |
| | | | 715/753 |
| 2012/0303736 A1 | 11/2012 | Novotny et al. | |
| 2013/0197968 A1* | 8/2013 | Davis | H04L 67/306 |
| | | | 705/7.29 |
| 2013/0204669 A1 | 8/2013 | Percy | |
| 2014/0180826 A1* | 6/2014 | Boal | G06Q 30/0245 |
| | | | 705/14.66 |
| 2014/0207622 A1* | 7/2014 | Vijayaraghavan | |
| | | | G06Q 30/0631 |
| | | | 705/26.62 |
| 2014/0244399 A1 | 8/2014 | Orduna et al. | |
| 2014/0344015 A1 | 11/2014 | Puertolas-Montanes et al. | |
| 2015/0019342 A1 | 1/2015 | Gupta | |
| 2015/0019714 A1* | 1/2015 | Shaashua | H04W 4/70 |
| | | | 709/224 |
| 2015/0220734 A1* | 8/2015 | Nalluri | G06F 21/51 |
| | | | 726/23 |
| 2016/0306689 A1 | 10/2016 | Jain | |
| 2017/0032248 A1* | 2/2017 | Dotan-Cohen | G06N 5/02 |
| 2017/0046806 A1 | 2/2017 | Haldenby et al. | |
| 2017/0053015 A1 | 2/2017 | Tiell et al. | |
| 2017/0053131 A1 | 2/2017 | Modi et al. | |
| 2017/0053295 A1 | 2/2017 | Tiell et al. | |
| 2017/0054611 A1 | 2/2017 | Tiell et al. | |

OTHER PUBLICATIONS

U.S. Notice of Allowance for U.S. Appl. No. 15/095,481, dated Jan. 22, 2018, 24 pages.
U.S. Final Office Action for U.S. Appl. No. 15/093,344, dated Dec. 5, 2018, 19 pages.
[No Author Listed], "Internet of things IoT semantic interoperability: research challenges, best practices, recommendations and nest steps" European Research Cluster on the Internet of Things, Mar. 2015, 48 pages.
Jara et al. "Semantic Web of Things: an analysis of the application semantics for the IoT moving towards the IoT Convergence" in International Journal of Web and Grid Service, Apr. 2014.

* cited by examiner

RECOMMENDATION ENGINE FOR AGGREGATED PLATFORM DATA

CROSS-REFERENCE TO RELATED APPLICATION

This application claims priority to U.S. Provisional Patent Application Ser. No. 62/206,078 filed on Aug. 17, 2015, titled "Super-Platform," which is hereby incorporated by reference in the entirety.

BACKGROUND

With the rapid growth of ubiquitous computing and the Internet of Things (IoT), users are interacting with many different computing systems in the course of their lives. In addition to interacting with devices whose primary function is computing, such as home computers, mobile computing devices, server computers, and so forth, users may also interact with devices that include computers as components, such as smart appliances, automotive computers, or any number of IoT devices. The various computing devices may generate data regarding users, and such data may be generated and delivered using different formats, models, or communications channels.

SUMMARY

Implementations of the present disclosure are generally directed to determining recommendations based on data. More specifically, implementations are directed to receiving and aggregating, at a super-platform, data generated by multiple individual platforms of various types, and determining recommendations based on the data and/or aggregate data.

In general, innovative aspects of the subject matter described in this specification can be embodied in methods that includes actions of: receiving data generated by a plurality of individual platforms associated with a super-platform, the data associated with an end-user of the plurality of individual platforms; determining one or more recommendations for the end-user based at least partly on the data; and providing the one or more recommendations for presentation to the end-user.

Implementations can optionally include one or more of the following features: the actions further include aggregating the data to generate aggregate data associated with the end-user; the one or more recommendations are determined based on the aggregate data; providing the one or more recommendations includes presenting the one or more recommendations in an interface provided by the super-platform in response to a request submitted by the end-user through a search engine executing on the super-platform; providing the one or more recommendations includes providing the one or more recommendations to a third party recommendation platform that is external to the super-platform; the one or more recommendations are for at least one of a product, a service, or content offered through at least one of the plurality of individual platforms; determining the one or more recommendations is based on determining a correlation between at least two different portions of the data from different ones of the plurality of individual platforms; and/or the plurality of individual platforms include at least two of an e-commerce platform configured to provide an e-commerce service, a retail platform configured to support retail operations of a physical store, a media platform configured to provide an online media service, a mobile computing device, an Internet of Things (IoT) computing device, or an in-vehicle computer.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations provide the following advantages. By determining recommendations based on data from multiple platforms of different types, implementations provide more accurate recommendations for a user than those provided by traditional platforms that may have access to data from a single platform and/or a single type of platform. By providing more accurate recommendations, implementations may also provide technical advantages over traditional platforms. For example, implementations may generate fewer, but more focused and accurate, recommendations than traditional platform, such that the recommendation engine of the super-platform may consume less storage, memory, processing power, and/or other computing resources compared to traditional recommendation systems. Moreover, by providing a more accurate set of recommendations to a user, implementations consume less storage, memory, processing power, network bandwidth, and/or other resources than traditional systems which may be required to perform repeated attempts to generate a useful (e.g., accurate) recommendation for the user. In some implementations, by aggregating information at a particular (e.g., high) level, the super platform may also develop its own expertise at understanding domain context and recommending data sets and analytics techniques that may generate insights that are relevant to a particular domain. For example, humanitarian users may generally be looking for specific insights and have higher confidence from specific types and sources of data. The insights provided by the super-platform to such users may be focused on the particular concerns of such users, and accordingly may differ from the insights provided to users in other fields. Moreover, implementations may also provide for improved precision and/or outcomes as the ecosystem grows, and may provide exponentially improving recommendations as the ecosystem scales up. Data sets may also be able to be (e.g., de facto) rated by their frequency and context of use, thus improving trust as the platform scales up.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the

DESCRIPTION OF DRAWINGS

Like reference symbols in the various drawings indicate like elements.

DETAILED DESCRIPTION

Figure 1A:
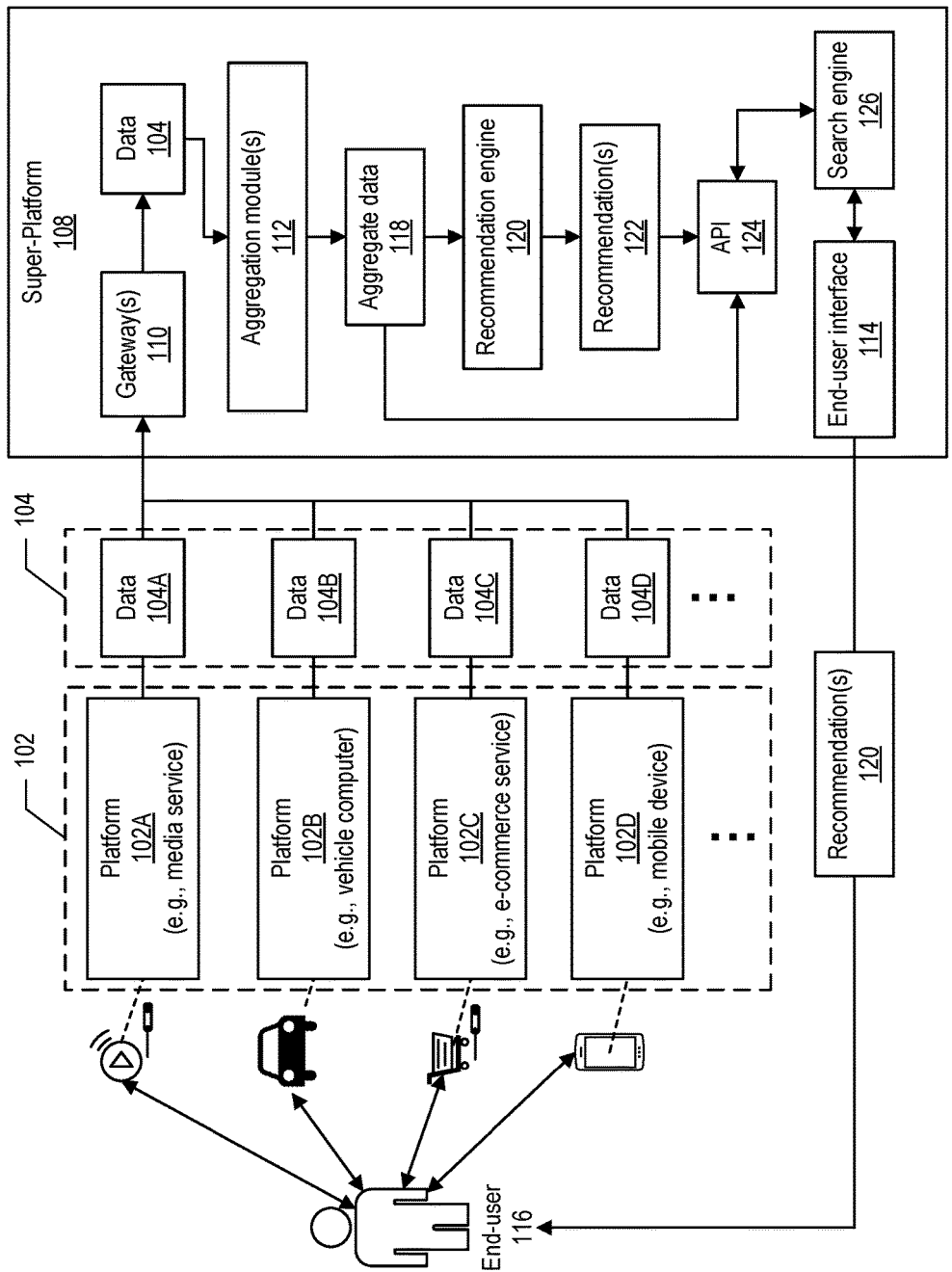
FIG. 1A depicts an example system for determining recommendation(s) for a user based on data from multiple data generating platforms, and providing the recommendation(s) to the user through a search engine, in accordance with implementations of the present disclosure.

Implementations of the present disclosure include systems, devices, methods, and computer-readable media for receiving data generated by multiple platforms of different types, and determining recommendations for end-user(s) of the multiple platforms based on an analysis of the received data. An end-user may interact with multiple individual (e.g., siloed) platforms of different types or that support different business purposes or industries. The individual platforms may generate data describing, and/or resulting from, these interactions with end-user(s). The data from the various individual platforms may be received, ingested, stored, analyzed, and/or otherwise processed by a super-platform. In some implementations, the data may be aggregated to generate aggregate data. The data and/or aggregate data may be analyzed by a recommendation engine executing on the super-platform. The recommendation engine may determine one or more recommendations for a particular end-user based on an analysis of the data and/or aggregate data associated with that end-user. Such recommendation(s) may be provided to the end-user through an end-user interface and search engine provided by the super-platform. In some examples, the recommendation(s) may be provided to a (e.g., third party) recommendation platform, which may interact with the end-user to provide recommendation(s). Implementations support various types of recommendation(s) for an end-user, including but not limited to: products to purchase; services to use; media content (e.g., audio, video, games, etc.) to download, stream, and/or play; other types of content to access; travel destinations; friend, business, and/or social connection recommendations; and so forth.

As used herein, super-platform refers to a computing system that includes any number of computing devices executing any number of software modules to receive, analyze, aggregate, store, distribute, and/or otherwise process data generated by any number of individual platforms. In some instances, the super-platform may be separate from the individual platform(s) and configured to communicate with the platform(s) using one or more networks. In some instances, the super-platform may share computing hardware and/or software resources with at least one of the individual platforms that is generating data. The super-platform may be configured to process data generated by multiple individual platforms that provide different types of services, as described further below.

In some implementations, various types of entities (e.g., individuals, computing devices, processes, etc.) may interact with the super-platform. Such entities may include data disclosers, data manipulators, and data consumers. A data discloser may be any entity that generates and/or provides the data to the super-platform. A data discloser may also be any entity that causes the data to be generated and/or provided to the super-platform. For example, an end-user of individual platform(s) may be a data discloser. An individual platform may also, itself, be a data discloser. A data manipulator may be any entity that analyzes, aggregates, and/or otherwise processes the data. For example, the super-platform and/or the various processes executing on the super-platform may be described as data manipulators. In some instances, the individual platforms and/or end-users may be data manipulators as well as possibly data disclosers, e.g., in scenarios where the data discloser manipulates the data in some way prior to disclosing the data to the super-platform. A data consumer may be any entity that receives the data and/or any information that is generated through manipulation of the data (e.g., aggregate data, analysis results, etc.). A data consumer may purchase or otherwise acquire information from the super-platform. In some instances, a data consumer may also be a data manipulator and/or data discloser. For example, a data consumer may purchase a set of data from the super-platform, analyze (e.g., manipulate) the data to produce analysis result(s) and/or other data set(s), and sell (e.g., disclose) the analysis result(s) and/or other data set(s) to the super-platform, individual platform(s), and/or other entities. Accordingly, a particular entity may operate in accordance with one or more of the roles of data discloser, data manipulator, and/or data consumer depending on the particular circumstances.

Figure 1B:
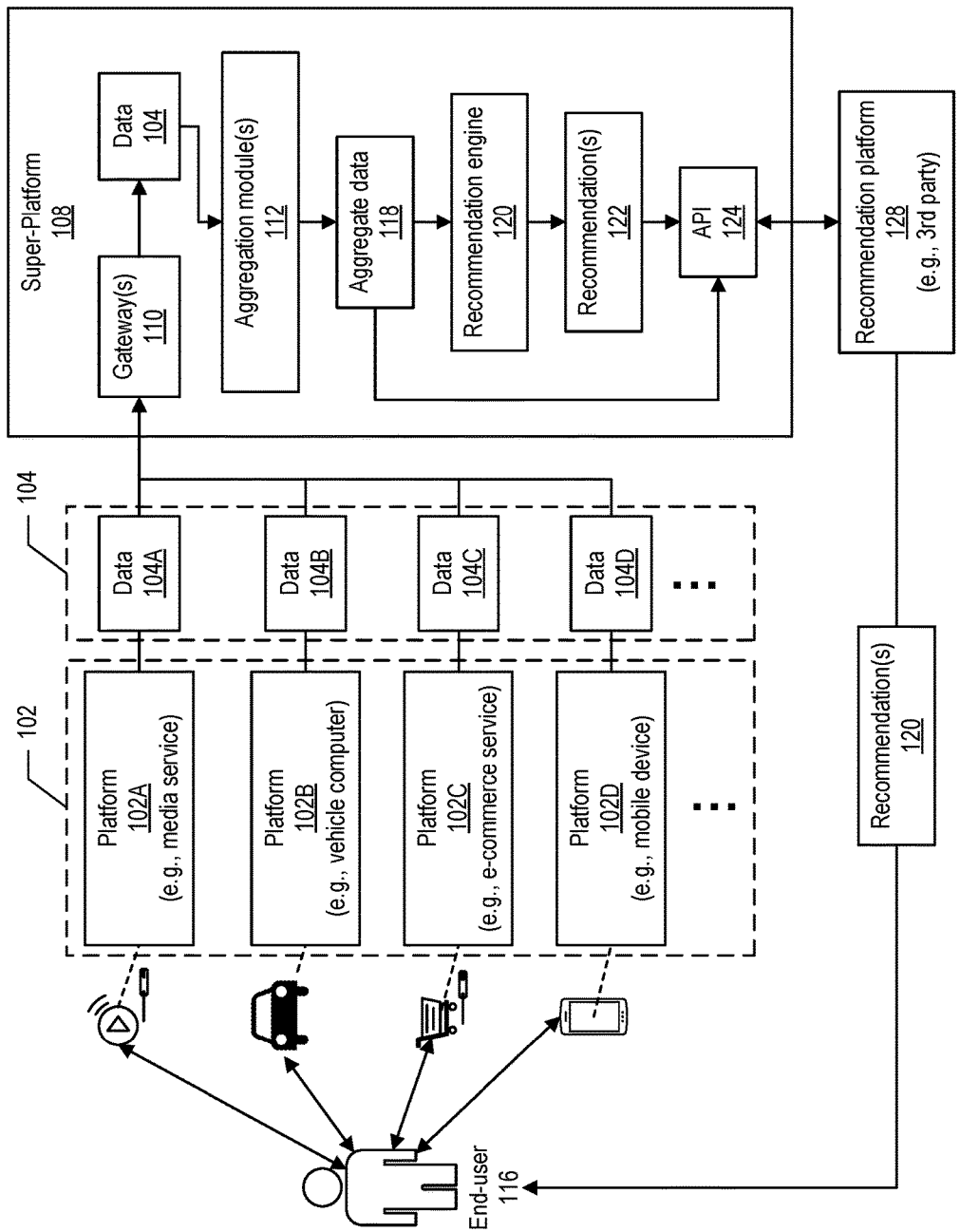
FIG. 1B depicts an example system for determining recommendation(s) for a user based on data from multiple data generating platforms, and providing the recommendation(s) to a third party recommendation platform, in accordance with implementations of the present disclosure.

FIGS. 1A and 1B depict example systems for collecting data from multiple data generating platforms and determining recommendation(s) based on the data, in accordance with implementations of the present disclosure. An end-user 116 may interact with multiple, different individual platforms, such as platforms 102A, 102B, 102C, 102D, . . . as shown in the example of FIGS. 1A and 1B. As used herein, platform(s) 102 refers to individual platform(s), such as platforms 102A, 102B, 102C, 102D, . . . as shown in the example of FIGS. 1A and 1B. Each of the individual (e.g., siloed) platforms 102 may generate data describing the end-user's interactions with the platform 102, such as one of data 104A, 104B, 104C, 104D, . . . as shown in the example of FIGS. 1A and 1B. As used herein, data 104 refers to data generated by individual platform(s), such as data 104A, 104B, 104C, 104D, . . . . as shown in the example of FIGS. 1A and 1B. In some implementations, the individual platforms 102 may provide different types of services, and/or may be different types of platforms that support businesses or other organizations in different types of industries. The platforms 102 may include, but are not limited to, one or more of the following:

A computing device, which may be a mobile or portable computing device such as a smartphone, tablet computer, notebook computer, personal data assistant (PDA), wearable computer (e.g., watch device or glasses device), and so forth;

An in-vehicle (e.g., automotive) computer that is a component of a commercial or personal-use vehicle or otherwise in communication with a vehicle, the in-vehicle computer configured to collect telematics data, data regarding the operations (e.g., speed, braking, gas mileage, etc.) of the vehicle, characteristics of the vehicle (e.g., temperature, fuel status, fluid status, etc.), location information, environment information (e.g., temperature, air pressure, etc.), and so forth;

Online services for streaming or otherwise delivering content over a network (e.g., the internet), such as video content, audio content (e.g., music), audio-visual content (e.g., films, television, etc.), games, graphics, images, or other media;

Online shopping or other e-commerce services that offer products or services through a web site, a native application, or other type of interface;

Computing systems, such as point-of-sale terminals, servers, data storage devices, and so forth that are associated with physical (e.g., brick-and-mortar) stores or other commercial enterprises, the computing systems collecting or otherwise generating data based on in-store customer activities;

Internet-of-things (IoT) computing devices, such as smart appliances, home entertainment devices, or other devices present in a home, business setting, or elsewhere, and configured to include processing, memory, and communications capabilities in a device used for other purposes, such as smart washing machines, heating and air conditioning systems, audio or video presentation systems, and so forth; or An analytics cloud or other distributed computing system, such as a social media analytics cloud (SMAC).

A platform 102 may include a technical (e.g., hardware and/or software) architecture, governance rules, and one or more technology services that support the creation and execution of applications. Such applications may be specific to a particular industry associated with the platform 102. For example, platforms 102 that are vehicle computing systems, brick-and-mortar retail support systems, health care provider systems, or health insurance portals may provide and support applications associated with vehicle operations, retail operations, health care operations, or health insurance operations respectively. A platform 102 may provide a blueprint for how a business or other organization may build, connect, and deliver applications specific to problems in their associated industry. A platform 102 may serve as a pool of reusable functionality and capabilities to make building and evolving applications fast and easy, and may help companies or other organizations achieve better business outcomes. A platform 102 may also serve as a business model strategy that creates competitive differentiation. In a platform-based business, others outside a company may create value for the enterprise and, in some examples, enable new digital models for the company.

A platform 102 may include any number of applications (e.g., apps), and service layers or plug-in modules that support one or more features. Example features include financial transactions, authentication, logon, navigation, search, advertisement, marketplaces, or any other appropriate feature. An individual platform 102 may include hardware, software, or both hardware and software components. For example, a platform 102 that is an in-vehicle (e.g., telematics) or other type of computing system may include hardware components such as processor(s), memory, network interfaces, and so forth, as well as software components such as an operating system, firmware, or any number of applications or processes executing on the hardware component(s). As another example, a platform 102 that is an e-commerce or media streaming service may include any number of web servers, application servers, applications, or other software component(s) that execute on one or more computing devices to enable an end-user 116 to view content or interact with the platform 102 through a user interface (UI).

The individual platforms 102 may each generate data 104 that is associated with end-user(s) 116, such as data describing user identity, user characteristics, user activities, user purchases, content browsed by the user, and so forth. In some examples, the data 104 may be provided to the platform(s) 102 by the end-user 116, or may be otherwise generated based on the end-user's interactions with the platform 102. The data 104 may include personally identifiable information (PII) of the end-user 116, such as user name(s), address(es), telephone number(s), login information (e.g., credentials) to access the individual platform 102, or other information that may enable identification of the particular end-user 116 or that is particularly associated with the end-user 116. The data 104 may also include other types of information that are associated with the particular end-user 116, but not necessarily explicitly provided by the end-user 116, such as information describing inferred or measured user characteristics (e.g., demographic characteristics), user activities on the platform 102, user purchase history, browsing data, clickstream data, and so forth. In some examples, the collected data 104 may include data that is generated by an individual platform 102 but that is not specific to a particular end-user 116. For example, an individual platform 102 that is a vehicle or in-vehicle telematics device may provide data 104 that is collected by sensors of the vehicle, such as data describing temperature, air pressure, location, velocity, vehicle operational state, or other information. As another example, a platform 102 that is a computing device may generate and provide data 104 describing the location of the device, used and available memory capacity, used and available processing capacity, used or available storage capacity, installed or executing applications, hardware configuration, software configuration, and/or other information that is not specifically associated with an end-user.

The data 104 generated by the platform(s) 102 may include any number of data objects. As used herein, a data object may include any size or amount of data that is arranged according to any format, or unformatted. A data object may include data of any type, and may include data that is compressed or uncompressed, encrypted or unencrypted. In some examples, a data object may include a particular amount of data and may be arranged according to a format such that the data object has a particular size when communicated. Data object(s) may also include a stream of data that continues for any duration to communicate any amount of data until the end of the stream. Data object(s) may be communicated in a sequence corresponding to an order of the data included in the data object(s). The data object(s) may also be communicated out of sequence, and may include sequence indicators or order indicators that enable a receiving process to reorder the received data object(s) into the order in which they were generated.

The data 104 generated by the individual platforms 102 may be sent to a (e.g., centralized) super-platform 108. For each individual platform 102, the super-platform 108 may include a gateway 110 that operates as an interface to receive the data 104 from the individual platform 102. The super-platform 108 may store the data 104, and may perform operations on the data 104 to process, store, analyze, aggregate, or otherwise handle the data 104 during various stages of the data lifecycle. The super-platform 108 may include any number of software modules executing on any number of computing devices. Such software module(s) may include aggregation module(s) 112, a recommendation engine 120, an application programming interface (API) 124, a search engine 126, and/or an end-user interface 114. In some examples, the super-platform 108 may be implemented as a cluster or other group of server computers configured to execute the software module(s) that provide and support a super-platform service to ingest data 104, analyze, store, aggregate, or otherwise process the data 104. In some implementations, the super-platform 108 may include a marketplace (not shown) to distribute (e.g., sell) the data 104, aggregate data 118, recommendation(s) 122, data analysis result(s), or other information to data consumer(s).

In some implementations, the data 104 received from the platform(s) 102 may be stored in data storage. The data storage may be incorporated into the super-platform 108. In some implementations, the data 104 may be stored in data storage that is external to the super-platform 108 and accessible by the various software module(s) executing on the super-platform 108. Implementations support the use of any storage format, including relational and/or non-relational data storage formats. In some instances, the data 104 may be stored in a compressed and/or encrypted form. The data storage may be secured against access by unauthorized users, processes, or other entities.

In some implementations, the super-platform 108 may execute one or more aggregation module(s) 112 that aggregate the data 104 to generate aggregate data 118. Data aggregation may aggregate data 104 that is associated with a single end-user 116 of one or more platforms 102. Data aggregation may also aggregate data 104 associated with multiple end-users 116. For example, data aggregation may generate data sets for particular segments of end-users, such as individuals having particular demographic characteristics, location, demonstrated interest in products or services, purchase history, and so forth. Aggregate data may include, or be generated based on, data that describes or identifies users, such as PII for one or more users. Aggregate data may also include, or be generated based on, data that is not associated with users, such as sensor data. The super-platform 108 may aggregate data 104 received from different platforms 102 that support different types of operations or that are associated with different industries. For example, the super-platform 108 may aggregate data 104 from an end-user's smartphone, a brick-and-mortar retail business where the end-user shops, the end-user's in-vehicle telematics device, a streaming video service used by the end-user, and/or other platform(s) 102 used by the end-user 116.

The super-platform 108 may also execute other analysis module(s) that perform other types of analysis regarding the data 104, including but not limited to data combination, data correlation, mathematical and/or statistical analysis, analysis to identify trends and/or patterns in the data 104, analysis that employs machine learning techniques, semantic and/or natural language based analysis of text data, image and/or audio data analysis, or other types of processing. In some instances, the super-platform 108 may analyze the data 104, e.g., execute analysis job(s), according to analysis request(s) received from data consumer(s).

In some implementations, data 104 may be tagged or otherwise associated with metadata that describes various aspects of the data 104. Aggregation of the data 104 may be based on the metadata that describes the data 104. For example, a temperature value in the data 104 may be associated with metadata identifying that particular portion of data 104 as a temperature value, or the metadata may indicate the unit of measure of that portion of data 104. In some examples, metadata may describe the source of the data 104, such as the individual platform 102 that generated the data 104, the particular end-user whose interactions with the individual platform 102 caused the generation of the data 104, and so forth. The metadata describing the source platform 102 may enable the super-platform 108 to perform various (e.g., unique or targeted) functions with regard to the data 104. For example, metadata identifying the source platform 102 may enable the data 104 to be retracted from use, or recalled from distribution, if it is later determined that the data 104 from the platform 102 is inaccurate in some way. Metadata may also identify a particular hardware or software component of the platform 102 that generated the data 104. For example, after ingestion of data 104 the individual platform 102 that supplied the data 104 may determine that a particular sensor that generated the data 104 is faulty, and the super-platform 108 may prevent further use of data 104 from that particular sensor. As another example, the super-platform 108 may perform operations to remove the faulty data 104 from aggregate data, statistically correct for the inclusion of faulty data 104, or other operations, such as to offset a calibration abnormality of the sensor.

For a particular portion of data 104, the super-platform 108 may determine as much metadata as possible to describe the data 104. In this way, the super-platform 108 may be described as a metadata-rich environment that enables the data 104 to be interrogated or otherwise analysis in various ways, even in ways not anticipated when the data 104 was generated or received at the super-platform 108. Metadata may indicate a source of the data 104, such as one or both of the end-user or individual platform 102 that generated the data 104. Metadata may also indicate an owner of the data 104 at various stages in the data lifecycle of generation. The data lifecycle may include: ingestion by the super-platform 108; processing (e.g., analysis, aggregation, etc.); storage; distribution to data consumer(s); and deletion or retirement of the data 104. In some implementations, the metadata is formatted according to a Resource Description Framework (RDF) or any other metadata format.

In some implementations, an individual platform 102 may provide metadata with the data 104 that is ingested into the super-platform 108. In examples where an individual platform 102 does not provide metadata, or provides incomplete metadata, the super-platform 108 may generate metadata for the ingested data 104. This generation of metadata may be through a natural language (NL) or semantic analysis of the ingested data 104. In some examples, the super-platform 108 may generate metadata such as location tags or time tags for the ingested data 104, e.g., based on other information indicating a location of the platform 102 or a time when the metadata was generated or received. In some examples, the super-platform 108 may infer or otherwise determine metadata for a portion of data 104 based on a semantic or format-based analysis of the data 104 to match the data 104 with one or more known patterns or formats of data. For example, if the data matches a known pattern or format for (e.g., "looks like") a value for air pressure, the data 104 may be tagged as air pressure data. The super-platform 108 may also add metadata based on context information that is known about the individual platform 102 or the end-user.

In some examples, the super-platform 108 may also flag data 104 that the super-platform 108 is unable to reliably tag (e.g., determine metadata) automatically with an adequate degree of confidence in the tagging. The flagging of data 104 that cannot be tagged may lead to a manual review and manual determination of metadata for the data 104. In some examples, metadata tagging may be performed at a higher level or with less detail describing the data 104. For example, it may be sufficient to know that a particular portion of data 104 is describing a movie, without knowing which particular aspect (e.g., title, genre, plot synopsis, cast, etc.) is being described by the data 104.

In some implementations, the data 104 received from different individual platforms 102 may be normalized. Such normalization may impose a common format for the metadata, or for the data 104 itself, in situations where different individual platforms 102 provide data 104 or metadata in different formats, styles, data types, and so forth. Normalization may also include determination that different sets of data 104 from different individual platforms 102 are associated with the same end-user 116, in examples where the different individual platforms 102 employ a different user identifier for the end-user 116. In such examples, normalization may generate or alter metadata to use a same user identifier to identify the same end-user. Normalization may normalize data 104 received from different countries or other geographical regions, to normalize the data 104 or metadata to employ a same system of measurement, language, or other format.

In some implementations, a semantic data model may be determined that describes the ingested data 104 for a single platform 102 or for multiple platforms 102. The semantic data model may sit on top of the other types of metadata and provide a framework or set of relationships that describes multiple portions of data 104 having different metadata. For example, a semantic data model may describe a movie and may describe relationships between differently metadata-tagged portions of data, such as a relationship between movie title, description, cast, studio, format, length, genre, and so forth. The semantic data model may be described as a structure or map of the data 104, and may be determined based on the metadata. In some examples, the semantic data model may be hierarchical. For example, data 104 describing a refinery may include multiple gauges, valves, or other components, and those components may have sub-components, which may themselves have sub-components, and so forth.

The super-platform 108 may be configured to dynamically adapt to the addition of new individual platforms 102 by determining how the data 104 provided by a new individual platform 102 fits into an existing semantic data model that describes previously ingested data 104 from other platform(s) 102. Capabilities of the newly added individual platform 102 may be determined by analogizing or otherwise comparing to the new platform 102 to existing, similar individual platforms. For example, a new platform 102 may be associated with the semantic data model of a currently supported platform 102 that is similar to the new platform 102 with regard to type of platform, hardware or software configuration, type of service provided by the platform, format of the data, mechanism(s) for accessing and/or receiving the data from the platform, or other characteristics of the platforms. In some implementations, machine learning may be employed to determine the semantic data model and/or other capabilities of a newly available platform 102.

Machine learning algorithm(s) may examine data sets that are sufficiently described by metadata and, using the metadata, may apply a semantic data model to a new data set from a new platform 102 that might extend, augment, improve, or stand alongside an existing data set from current platform(s) 102.

Aggregation of the data 104, by the aggregation module(s) 112, may generate one or more sets of aggregate data 118 based on data 104 from multiple individual platforms 102 and/or multiple end-users 116. Data 104 may be aggregated according to particular demographic characteristics, location, and/or other characteristics of end-user(s) 116. For example, the aggregation module(s) 112 may access data associated with a set of users and aggregate the data 104 to create aggregate data 118 describing the buying habits, browsing habits, and/or other characteristics of users in a particular market segment defined by location, age, gender, and/or other criteria for the set of users. In some examples, the aggregate data 118 may be generated to not include any PII. In some examples, the aggregate data 118 may be generated based on particular requests from data consumers, end-user(s) 116, and/or recommendation platform(s) 128. The aggregation module(s) 112 may also generate aggregate data 118 prior to, and in anticipation of, receiving any particular request(s) for aggregate data 118 and/or recommendation(s) 122.

In some examples, the data 104 may be received in a variety of formats or according to a variety of protocols supported by the various individual platforms 102. The aggregation module(s) 112 may normalize the data 104 to a common format or protocol prior to or during aggregation. Aggregation may also determine that different sets of data 104, from different individual platforms 102, are associated with a same end-user 116. This determination may be based on a common user identifier used by the various platforms 102. In some examples, a common end-user may be inferred based on a correspondence and/or similarity between the end-user's name, address, demographic characteristics, location, email address, internet protocol (IP) address, computing device identifier(s), or other information associated with the end-user on various platforms 102. The determination may be based on pixels, beacons, cookies, or other data employed to track an end-user's activities across multiple platforms. In some examples, user context, location, behavioral characteristics, or other information may be employed to infer that an end-user is the same individual using multiple platforms 102.

In some implementations, the aggregation module(s) 112 may index the data 104 and/or aggregate data 118 for search. Indexing may generate one or more indexes to facilitate search according to various parameters. The index(es) may be updated as additional data 104 is received from the individual platforms 102, and/or as additional aggregate data 118 is generated.

The aggregate data 118 may be accessed by a recommendation engine 120, which may analyze the aggregate data 118 to generate recommendation(s) 122 for the particular end-user 116 that is associated with the data 104 and/or aggregate data 118. In some examples, the recommendation(s) 122 may be for a group, class, category, and/or type of end-users that share common characteristic(s). The recommendation(s) 122 may include recommendation(s) regarding media (e.g., video, music, games, etc.) that the recommendation engine 120 predicts the end-user 116 may enjoy based on the aggregate data 118 for the end-user 116. Recommendation(s) 122 may also include recommendation(s) regarding products and/or services to purchase, businesses and/or other locations to visit, friend and/or follow suggestions for social networking, and so forth. One or more of the data 104, the aggregate data 118, or the recommendation(s) 122 may be stored on the super-platform 108, or on external device(s) accessible to the super-platform 108 over one or more networks.

Generating the recommendation(s) 122 may include identifying patterns in the data 104 and/or aggregate data 118 across different individual platforms 102. For example, the recommendation engine 120 may determine a pattern that the end-user 116 watches a particular genre of video content based on the data 104 received from different content streaming platforms. As another example, the recommendation engine 120 may determine a pattern that the end-user 116 prefers a particular type or brand of product based on multiple browses and/or purchases on different individual platforms 102.

In some implementations, the recommendation engine is also context-sensitive and able to learn overtime. For instance, humanitarian organizations may look for specific types of data sets and are generally looking for a specific set of insights, whereas a marketing agency, public relations firm, and/or medical researcher may each have their own categories of insights that are more common. The recommendation engine may be configured to drive recommendations based on a particular domain context. In some instances, the recommendation engine includes a machine learning component that attempts to learn these preferences in an automated way to inform the recommendation engine and develop its own expertise overtime. As the ecosystem for this recommendation engine grows, a neural network may be employed to achieve distributed results.

Generating the recommendation(s) 122 may also include identifying correlations between different types of data 104 and/or aggregate data 118. For example, data 104 from a wearable computing device (e.g., a Fitbit™, watch computer, etc.) may indicate that an end-user 116 runs at a particular time each evening, and data 104 from a streaming site may indicate that the end-user 116 watches a particular genre of video content (e.g., sports movies) at a subsequent time. The recommendation engine 120 may determine a time-based correlation between these two sets of data 104, and infer that the end-user 116 exhibits a pattern of watching the particular genre of video content after running. Correlation may be time-based, location-based, and/or based on other factors. Correlation and pattern recognition may be employed to predict content, products, services, activities, and/or other information that may be desirable to the end-user 116, and such predictions may be included in the recommendation(s) 122.

The data 104, aggregate data 118, and/or recommendation(s) 122 for each end-user 116 may be described as a knowledge base for that end-user 116. The super-platform 108 may provide (e.g., expose) at least one API 124 that enables processes to request information from the knowledge base for one or more end-users 116. For example, the API 124 may be called by a process to request recommendation(s) 122 and/or aggregate data 118 for one or more end-users 116. In some instances, the recommendation(s) 122 may be for a product, a service, media content, and/or other types of content that is offered through at least one of the platform(s) 102.

In some implementations, as shown in FIG. 1A, the super-platform 108 may include a search engine 126 that is configured to receive search queries from end-users 116 interacting with an end-user interface 114 of the super-platform 108. In some examples, an end-user 116 may submit, through the end-user interface 114, a search query specifying a type of recommendation 122 that the end-user 116 would like to receive. For example, the end-user 116 may submit a query requesting comedy films and/or television shows recommended for the end-user 116. As another example, the end-user 116 may submit a query requesting particular types of products, services, and/or locations recommended for the end-user 116, such as recommended restaurants, vacation spots, bicycles, clothing items, games, and so forth. The search engine 126 may perform the query through the API 124 and receive, from the API 124, any recommendation(s) 122 that match the end-user's search criteria. Such recommendation(s) 122 may have been previously generated, based on the aggregate data 118, and stored. In some implementations, the recommendation(s) 122 may be generated in response to the query. The search engine 126 may provide the recommendation(s) 122 to the end-user interface 114, which may present the recommendation(s) 122 to the end-user 116 in response to the end-user's query.

In some examples, recommendation(s) 122 may be provided to the end-user 116 as a push notification, e.g., not in response to any particular query from the end-user 116. In some instances, the pushing of recommendation(s) 122 may be based, at least partly, on preferences previously specified by the end-user 116. For example, the end-user 116 may indicate that he or she wishes to receive recommendation(s) 122 regarding movies, and the search engine 126 or other module may push movie recommendations to the end-user 116. Recommendation(s) 122 may be pushed periodically based on a preference set by the end-user 116 (e.g., weekly push notifications), and/or may be pushed to the end-user 116 as the recommendation(s) 122 are generated by the recommendation engine 120. The end-user 116 may also receive recommendation(s) 122 that are generated based on the data 104 and/or aggregate data 118 of the end-user's friends, acquaintances, family members, business associates, social network connections, or other(s) associated with the end-user 116. In some instances, recommendation(s) 122 may be generated for an end-user 116 based on the data 104 and/or aggregate data 118 for user(s) that share characteristic(s) with the end-user 116, such as location, demographic characteristic(s), similar demonstrated interests, shopping or browsing habits, and so forth.

FIG. 1A depicts an example system in which recommendation(s) 122 are provided to an end-user 116 through a search engine 126 and/or end-user interface 114 included in the super-platform 108. Implementations also support the use of other channels for providing recommendation(s) 122. FIG. 1B depicts an example system in which the recommendation(s) 122 for an end-user 116 are provided to a recommendation platform 128 which may provide the recommendation(s) 122 to the end-user 116. In some examples, the recommendation platform 128 is a third party platform that is external to the super-platform 108 and/or the platform(s) 102. For example, the recommendation platform 128 may be operated by a business or other organization that is unaffiliated with the super-platform 108, but able to communicate with the super-platform 108 to request information. The recommendation platform 128 may be one of the individual platforms 102 that contributed data 104 to the super-platform 108, or a third party platform that did not contribute data 104 to the super-platform 108.

As shown in FIG. 1B, the recommendation platform 128 may call into the API 124 to request aggregate data 118 and/or recommendation(s) 122 for one or more end-users 116. In some instances, the recommendation platform 128 may request and receive at least a portion of the aggregate data 118 for an end-user 116, and the recommendation platform 128 may generate the recommendation(s) 122 for the end-user 116 based on the aggregate data 118. In some instances, the recommendation platform 128 may request, through the API 124, the recommendation(s) 122 that were generated for the end-user 116 by the recommendation engine 120 of the super-platform 108. The recommendation platform 128 may provide at least a portion of the recommendation(s) 122 in response to a request from the end-user 116. In some examples, the recommendation platform 128 may be provided with the aggregate data 118 and/or the recommendation(s) 122 in exchange for a payment or other value. For example, the API 124 may be a component of a marketplace associated with the super-platform 108.

The recommendation platform 128 may employ the API 124 of the super-platform 108 to request information that may not be otherwise available to the recommendation platform 128. For example, the recommendation platform 128 may gather its own information regarding the end-user 116, but may not have access to the data 104 generated by the other individual platforms 102 except through the API 124. Accordingly, the API 124 may enable the super-platform 108 to provide a valuable, monetizable service to the recommendation platform 128, to enable the recommendation platform 128 to provide recommendation(s) 122 that are more accurate than those based on a less comprehensive set of user data.

In some implementations, the super-platform 108 may be configured to solicit and receive feedback from the end-user 116 regarding the recommendation(s) 122 provided by the super-platform 108 and/or the recommendation platform 128. For example, the end-user 116 may be asked whether a particular recommendation 122 of a product or service was useful to the end-user 116, whether the end-user 116 enjoyed recommended media content, and so forth. Feedback may be solicited from the end-user 116 through the end-user interface 114. Feedback may also be collected based on the end-user's activities (e.g., on the platform(s) 102) subsequent to receiving a recommendation 122, such as whether the end-user 116 bought a product or service following a recommendation 122, or whether the end-user 116 consumed a recommended media item (e.g., movie, television, game, and/or music recommendation). The feedback may be employed to improve and/or refine the operations of the recommendation engine 120 using one or more supervised or unsupervised machine learning techniques. The feedback may also be employed to modify the recommendation(s) 122 for that end-user 116 and/or other end-users. For example, if the end-user 116 indicates (e.g., directly through feedback or indirectly through subsequent behavior) that he or she does not enjoy a particular movie, the movie may no longer be recommended for the end-user 116 and/or for similar end-user(s). In some implementations, a neural network approach to machine learning may be employed to achieve distributed results.

In some implementations, the collected data 104, aggregate data 118, recommendations 122, data analysis result(s), and/or other information may be offered for sale or other distribution to data consumer(s) such as the recommendation platform 128 or other consumer(s). In some implementations, the information may be distributed through a marketplace associated with the super-platform 108 and/or through the API 124. In some examples, an end-user 116 may opt in to allow their user-related data 104, aggregate data 118, recommendation(s) 122, and/or other information to be sold or otherwise distributed. The end-user 116 may provide a price for the information. The end-user 116 may also provide restriction(s) governing which entities may receive the information, and/or restriction(s) governing the uses of the information by the receiving entities. For example, an end-user 116 may specify that their data may not be provided to data consumer(s) that intend to use the data for a particular purpose, such as research associated with a particular political position, campaign, or cause. As another example, an end-user 116 may specify that their data may not be provided to particular types of organizations. For example, an end-user 116 may state that their data may be sold to non-profit research organizations but not to for-profit corporations. An end-user 116 may also specify the manner in which their data may be used. For example, an end-user 116 may specify that their data may be used after it has been anonymized to remove and/or obfuscate any PII.

The super-platform 108 may create an adhesive experience for data consumers, such that data consumer(s) are incentivized to return to the super-platform 108 for their future data needs. This adhesive experience may be achieved by providing data consumers with data 104, aggregate data 118, recommendation(s) 122, analysis job(s), data analysis result(s), and/or other information that the data consumer(s) may not have access to elsewhere. By providing, analyzing, and/or aggregating data 104 generated by multiple individual platforms 102 of different types, and by generating recommendation(s) 122 based on data 104 from multiple individual platform 102 of different types, the super-platform 108 may provide greater value than that provided by the individual platform(s) 102 alone or by platform(s) 102 of a single type.

Figure 2:
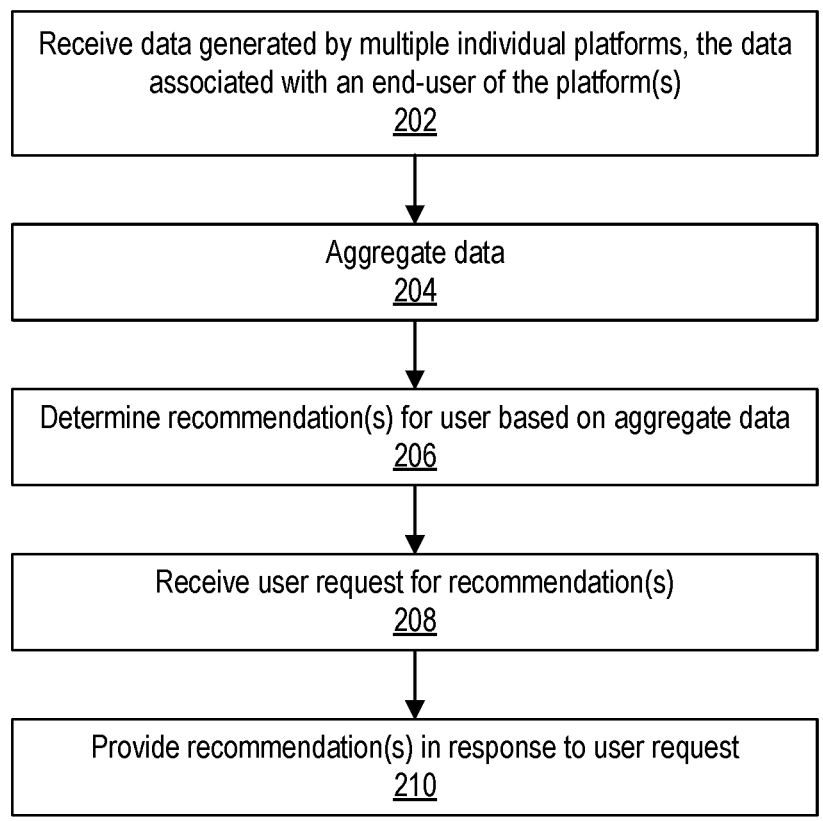
FIG. 2 depicts an example process for determining recommendation(s) for a user based on data from multiple data generating platforms, and providing the recommendation(s) to the user through a search engine, in accordance with implementations of the present disclosure.

FIG. 2 depicts an example process for determining recommendation(s) 122 for an end-user 116 based on data 104 from multiple data generating platforms 102, and providing the recommendation(s) 122 to the end-user 116 through a search engine 126 and/or end-user interface 114 of the super-platform 108, in accordance with implementations of the present disclosure. Operations of the process may be performed by one or more of the gateway(s) 110, the aggregation module(s) 112, the recommendation engine 120, the API 124, the search engine 126, the end-user interface 114, and/or other software module(s) executing on the super-platform 108, the platform(s) 102, the recommendation platform 128, or elsewhere.

Data 104 may be received (202). As described above, the data 104 may be generated and received from multiple platforms 102 (e.g., of different types), and may be associated with an end-user 116 of the platform(s) 102. In some implementations, the data 104 may be aggregated (204) to generate aggregate data 118. One or more recommendation(s) 122 may be determined (206) for the end-user 116, based on an analysis of the aggregate data 118 and/or data 104 associated with the end-user 116.

In some implementations, a request for recommendation(s) 122 may be received (208) from the end-user 116. The request may be submitted by the end-user 116 through the end-user interface 114, and may be processed by the search engine 126 calling the API 124 to determine any recommendation(s) 122 that correspond to the end-user's request. The corresponding recommendation(s) 122, if any, may be provided (210) to the end-user 116 in response to the end-user's request. In some examples, the recommendation(s) 122 may be presented to the end-user 116 through the end-user interface 114.

Figure 3:
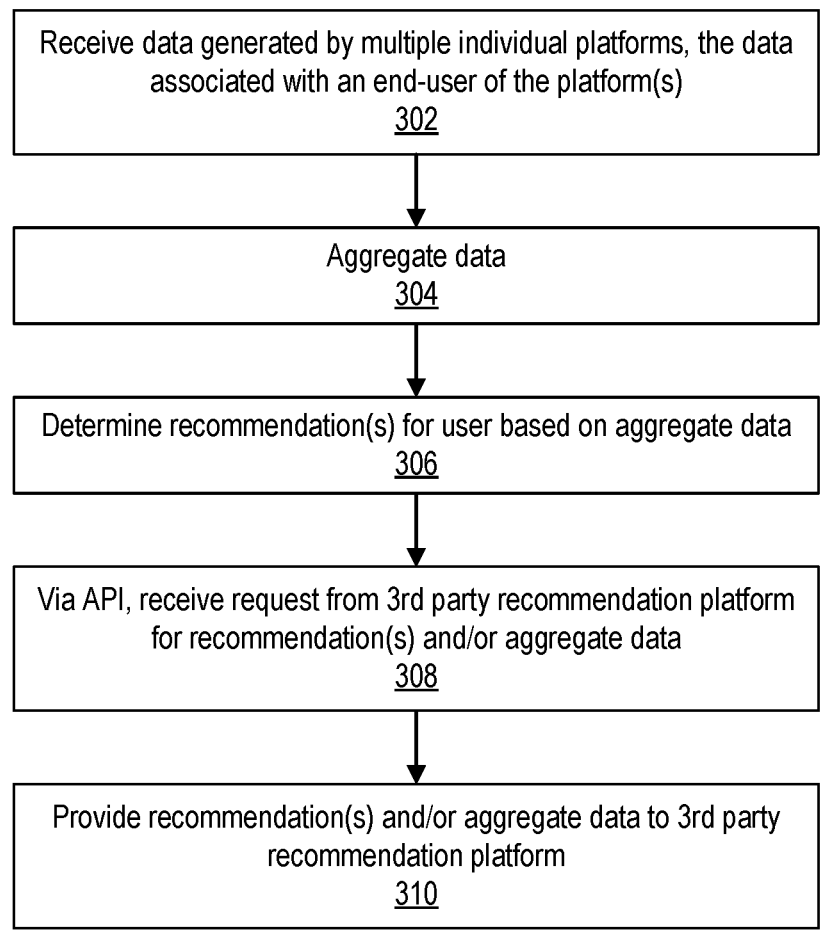
FIG. 3 depicts an example process for determining recommendation(s) for a user based on data from multiple data generating platforms, and providing the recommendation(s) to a third party recommendation platform, in accordance with implementations of the present disclosure.

FIG. 3 depicts an example process for determining recommendation(s) 122 for an end-user 116 based on data 104 from multiple data generating platforms 102, and providing the recommendation(s) 122 to a (e.g., third party) recommendation platform 128, in accordance with implementations of the present disclosure. Operations of the process may be performed by one or more of the gateway(s) 110, the aggregation module(s) 112, the recommendation engine 120, the API 124, the search engine 126, the end-user interface 114, and/or other software module(s) executing on the super-platform 108, the platform(s) 102, the recommendation platform 128, or elsewhere.

Data may be received (302) and aggregated (304), and recommendation(s) 122 may be determined (306) as described above. In some implementations, a request may be received from a recommendation platform 128, requesting aggregate data 118 and/or recommendation(s) 122 for one or more end-users 116. The request may identify the particular end-user(s) 116 by name, identification number, login, and/or other identifying information. As described above, the request from the recommendation platform 128 may be received (308) through the API 124. In response to the request, the aggregate data 118 and/or recommendation(s) 122 may be provided (310) to the recommendation platform 128. Based on the received information, the recommendation platform 128 may generate and/or communicate recommendation(s) 122 to the end-user(s) 116.

Figure 4:
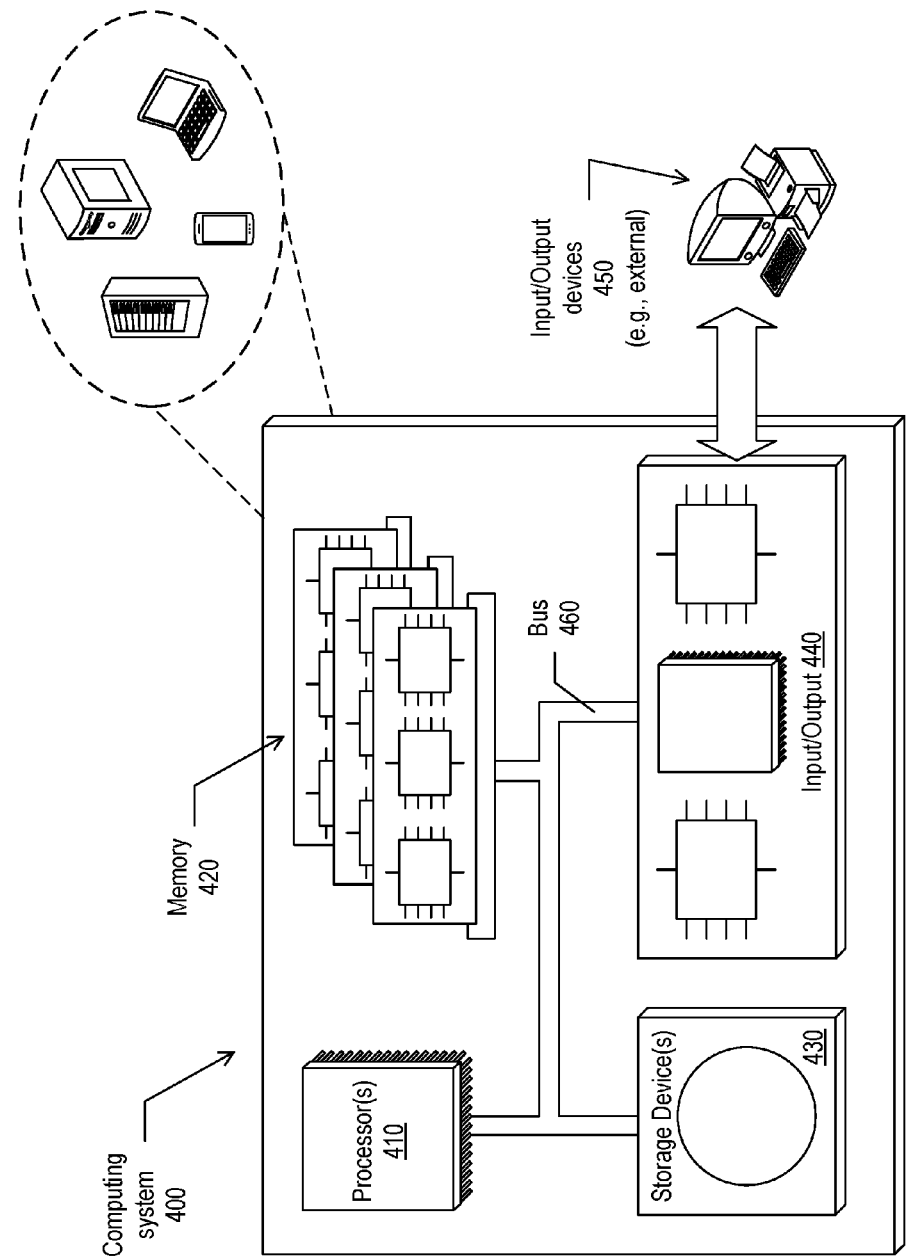
FIG. 4 depicts an example computing system architecture, in accordance with implementations of the present disclosure.

FIG. 4 depicts an example computing system 400 in accordance with implementations of the present disclosure. The system 400 may be used for any of the operations described with respect to the various implementations discussed herein. For example, the system 400 may be included, at least in part, in one or more of platforms 102, the super-platform 108, the recommendation platform 128, and/or other device(s) described herein. The system 400 may include one or more processors 410, a memory 420, one or more storage devices 430, and one or more input/output (I/O) devices 450 controllable through one or more I/O interfaces 440. Two or more of the components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

The features described may be implemented in digital electronic circuitry or in computer hardware, software, or any combinations of hardware and software. The features may be implemented in at least one computer program product that is tangibly embodied in an information carrier (e.g., a machine-readable storage device) for execution by a programmable processor. The method or process steps may be performed by a programmable processor executing instructions to perform functions of the described implementations by operating on input data and generating output. The described features may be implemented in one or more computer programs that are executable on a programmable system including at least one programmable processor coupled to receive data and instructions from, and to transmit data and instructions to, a data storage system, at least one input device, and at least one output device. A computer program may include a set of instructions that can be used, directly or indirectly, in a computer to perform a certain activity or bring about a certain result. A computer program may be written in any form of programming language, including compiled or interpreted languages, and it may be deployed in any form, including as a stand-alone program or as a module suitable for use in a computing environment.

The logic flows depicted in the figures do not require the particular order shown, or any particular sequential order, to achieve desirable results. In some implementations, other steps may be provided or steps may be eliminated from the described flows. Moreover, the steps may be performed in parallel or serially with respect to other steps. The systems depicted in the figures do not require the particular components, or the particular arrangement of components, shown in the figures. In some implementations, the various systems may include more or fewer components than shown in the figures, and components may be arranged differently to achieve desirable results. Accordingly, implementations other than those explicitly depicted in the figures or described herein are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method performed by at least one processor, the method comprising:

receiving, by the at least one processor, data generated by a plurality of individual platforms associated with a super-platform, wherein the data includes an instance of the data generated by each respective platform of the plurality of individual platforms, and wherein each instance of the data generated by each respective platform is associated with a same end-user of the plurality of individual platforms, at least one individual platform being added and the super-platform dynamically adapting to the at least one individual platform by determining how a respective instance of the data provided by the at least one individual platform fits into a semantic data model that describes previously ingested data from other individual platform;

analyzing, by the at least one processor, the data to determine a time-based correlation between: i) a first activity of the end-user indicated by a first instance of the data that is generated by a first platform of the plurality of individual platforms, and ii) a second activity of the end-user indicated by a second instance of the data that is generated by a second platform of the plurality of individual platforms;

determining, by the at least one processor, one or more recommendations for the end-user based at least partly on the time-based correlation between the first activity and the second activity; and providing, by the at least one processor, the one or more recommendations for presentation to the end-user.

2. The method of claim 1, further comprising:

aggregating, by the at least one processor, the data to generate aggregate data associated with the end-user;

wherein the one or more recommendations are determined based on the aggregate data.

3. The method of claim 1, wherein providing the one or more recommendations includes presenting the one or more recommendations in an interface provided by the super-platform in response to a request submitted by the end-user through a search engine executing on the super-platform.

4. The method of claim 1, wherein providing the one or more recommendations includes providing the one or more recommendations to a third party recommendation platform that is external to the super-platform.

5. The method of claim 1, wherein the one or more recommendations are for at least one of a product, a service, or content offered through at least one of the plurality of individual platforms.

6. The method of claim 1, wherein determining the one or more recommendations is further based on determining at least one other correlation between at least two different instances of the data from different ones of the plurality of individual platforms.

7. The method of claim 1, wherein the plurality of individual platforms include at least two of:
an e-commerce platform configured to provide an e-commerce service;
a retail platform configured to support retail operations of a physical store;
a media platform configured to provide an online media service;
a mobile computing device;
an Internet of Things (IoT) computing device; or
an in-vehicle computer.

8. A system comprising:
at least one processor; and
a memory communicatively coupled to the at least one processor, the memory storing instructions which, when executed by the at least one processor, cause the at least one processor to perform operations comprising:
receiving data generated by a plurality of individual platforms associated with a super-platform, wherein the data includes an instance of the data generated by each respective platform of the plurality of individual platforms, and wherein each instance of the data generated by each respective platform is associated with a same end-user of the plurality of individual platforms, at least one individual platform being added and the super-platform dynamically adapting to the at least one individual platform by determining how a respective instance of the data provided by the at least one individual platform fits into a semantic data model that describes previously ingested data from other individual platform;
analyzing, by the at least one processor, the data to determine a time-based correlation between: i) a first activity of the end-user indicated by a first instance of the data that is generated by a first platform of the plurality of individual platforms, and ii) a second activity of the end-user indicated by a second instance of the data that is generated by a second platform of the plurality of individual platforms;
determining one or more recommendations for the end-user based at least partly on the time-based correlation between the first activity and the second activity; and
providing the one or more recommendations for presentation to the end-user.

9. The system of claim 8, the operations further comprising:
aggregating the data to generate aggregate data associated with the end-user;
wherein the one or more recommendations are determined based on the aggregate data.

10. The system of claim 8, wherein providing the one or more recommendations includes presenting the one or more recommendations in an interface provided by the super-platform in response to a request submitted by the end-user through a search engine executing on the super-platform.

11. The system of claim 8, wherein providing the one or more recommendations includes providing the one or more recommendations to a third party recommendation platform that is external to the super-platform.

12. The system of claim 8, wherein the one or more recommendations are for at least one of a product, a service, or content offered through at least one of the plurality of individual platforms.

13. The system of claim 8, wherein determining the one or more recommendations is further based on determining at least one other correlation between at least two different instances of the data from different ones of the plurality of individual platforms.

14. The system of claim 8, wherein the plurality of individual platforms include at least two of:
an e-commerce platform configured to provide an e-commerce service;
a retail platform configured to support retail operations of a physical store;
a media platform configured to provide an online media service;
a mobile computing device;
an Internet of Things (IoT) computing device; or
an in-vehicle computer.

15. One or more computer-readable storage media storing instructions which, when executed by at least one processor, cause the at least one processor to perform operations comprising:
receiving data generated by a plurality of individual platforms associated with a super-platform, wherein the data includes an instance of the data generated by each respective platform of the plurality of individual platforms, and wherein each instance of the data generated by each respective platform is associated with a same end-user of the plurality of individual platforms, at least one individual platform being added and the super-platform dynamically adapting to the at least one individual platform by determining how a respective instance of the data provided by the at least one individual platform fits into a semantic data model that describes previously ingested data from other individual platform;
analyzing, by the at least one processor, the data to determine a time-based correlation between: i) a first activity of the end-user indicated by a first instance of the data that is generated by a first platform of the plurality of individual platforms, and ii) a second activity of the end-user indicated by a second instance of the data that is generated by a second platform of the plurality of individual platforms;
determining one or more recommendations for the end-user based at least partly on the time-based correlation between the first activity and the second activity; and
providing the one or more recommendations for presentation to the end-user.

16. The one or more computer-readable storage media of claim 15, the operations further comprising:
aggregating the data to generate aggregate data associated with the end-user;
wherein the one or more recommendations are determined based on the aggregate data.

17. The one or more computer-readable storage media of claim 15, wherein providing the one or more recommendations includes presenting the one or more recommendations in an interface provided by the super-platform in response to a request submitted by the end-user through a search engine executing on the super-platform.

18. The one or more computer-readable storage media of claim 15, wherein providing the one or more recommendations includes providing the one or more recommendations to a third party recommendation platform that is external to the super-platform.

19. The one or more computer-readable storage media of claim 15, wherein the one or more recommendations are for at least one of a product, a service, or content offered through at least one of the plurality of individual platforms.

20. The one or more computer-readable storage media of claim 15, wherein determining the one or more recommendations is further based on determining at least one other correlation between at least two different instances of the data from different ones of the plurality of individual platforms.

* * * * *